(12) United States Patent
Nasta et al.

(10) Patent No.: US 7,856,232 B2
(45) Date of Patent: Dec. 21, 2010

(54) TELEMETRY TRACKING AND COMMAND SATELLITE LINK

(75) Inventors: Rodolphe Nasta, Toulouse (FR); Emile Tonello, St Lys (FR); Rémi Challamel, Toulouse (FR)

(73) Assignee: Alcatel, Paris (FR)

( * ) Notice: Subject to any disclaimer, the term of this patent is extended or adjusted under 35 U.S.C. 154(b) by 1832 days.

(21) Appl. No.: 10/467,362

(22) PCT Filed: Feb. 4, 2002

(86) PCT No.: PCT/FR02/00411

§ 371 (c)(1),
(2), (4) Date: Aug. 7, 2003

(87) PCT Pub. No.: WO02/063797

PCT Pub. Date: Aug. 15, 2002

(65) Prior Publication Data

US 2004/0120291 A1    Jun. 24, 2004

(30) Foreign Application Priority Data

Feb. 8, 2001    (FR) .................................. 01 01706

(51) Int. Cl.
*H04W 4/00* (2009.01)
(52) U.S. Cl. .................................. 455/427; 342/357.1
(58) Field of Classification Search ............... 455/12.1, 455/13.1; 342/352, 357, 342, 353, 140, 257
See application file for complete search history.

(56) References Cited

U.S. PATENT DOCUMENTS

| 4,809,006 | A | * | 2/1989 | Dar | 342/352 |
| 5,128,680 | A | * | 7/1992 | Sabato et al. | 342/60 |
| 5,153,598 | A | * | 10/1992 | Alves, Jr. | 342/352 |
| 5,187,805 | A | * | 2/1993 | Bertiger et al. | 455/430 |
| 5,594,454 | A | * | 1/1997 | Devereux et al. | 342/357.09 |
| 5,937,001 | A | * | 8/1999 | Shockey | 375/142 |
| 5,995,040 | A | | 11/1999 | Issler et al. | |
| 6,385,233 | B1 | * | 5/2002 | Berger | 375/216 |

OTHER PUBLICATIONS

P. J. Wadner et al, "TTC Subsystem for the Olympus Spacecraft", Journal of the British Inerplanetary Society, GB, British Interplanetary Society, London, vol. 41, No. 7, Jul. 1, 1988, pp. 319-324, XP000100833.

J. B. Berner et al, "The NASA spacecraft transponding modem", 2000 IEEE Aerospace Conference, Proceedings (CAT No. 00TH8484) 2000 IEEE Aerospace Conference Proceedings, Big Sky, MT, USA, Mar. 18-25, 2000, pp. 195-209, vol. 7, XP002167267.

M. Richmaria, "Satellite Communication Systems", Mar. 10, 1999, MacMillan Press LTD, London XP002167268 pp. 299-304.

M. Otter, Spread-Spectrum Multiple Access for Spacecraft Service Functions (TT&C), ESA Journal, vol. 10, No. 1, 1986, pp. 277-290, XP000994602.

* cited by examiner

*Primary Examiner*—Tu X Nguyen
(74) *Attorney, Agent, or Firm*—Sughrue Mion, PLLC

(57) ABSTRACT

The invention relates to a telemetry, control, and ranging link of a satellite; it proposes using spread spectrum transmission for the up link, i.e. for commanding the satellite and for the ranging up signal. It proposes using subcarrier modulation for the down link, i.e. for telemetry and for the ranging down signal. This makes it possible for the up link to withstand interference and to provide co-localization; on the down link, the use of subcarrier modulation makes it possible to continue using existing equipment and known solutions.

13 Claims, 1 Drawing Sheet

TELEMETRY TRACKING AND COMMAND SATELLITE LINK

Figure 1:
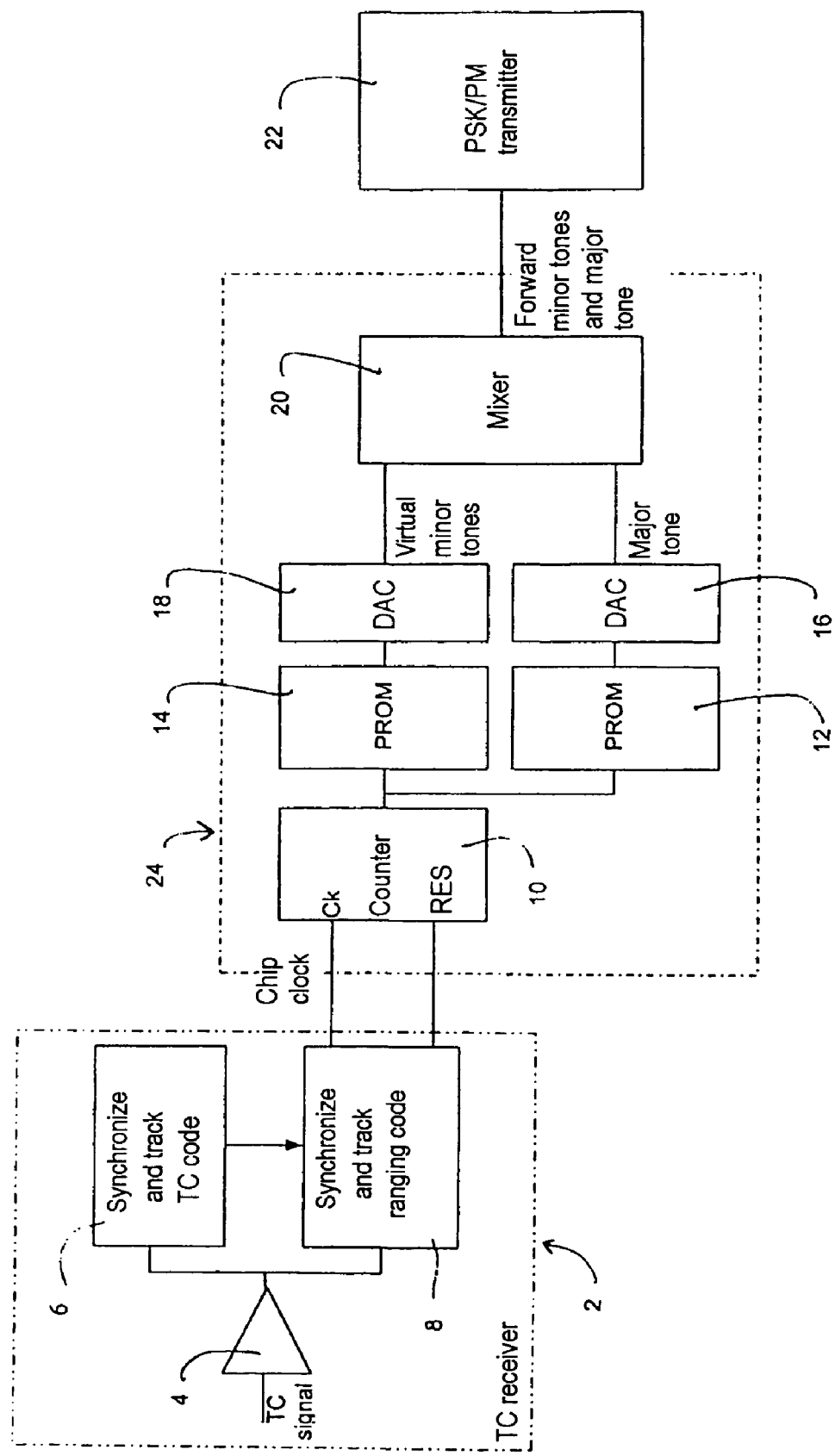

The invention relates to satellites, and more particularly to the telemetry, command, and distance measuring link between ground stations and a satellite. This link is commonly referred to as the TTC link (acronym for telemetry, tracking and command) or else the TCR link (for telemetry, command, and ranging). Such a link needs to be established in highly reliable manner throughout all stages in the lifetime of a satellite amongst which four main stages can be distinguished:

- a stage of moving onto station, which corresponds to the period from injection by the launcher until the satellite reaches its final position;
- a stage of keeping station, which corresponds to the stage of nominal operation of the satellite;
- an emergency stage, where appropriate, corresponding to a breakdown and during which the altitude of the satellite can be modified; and
- a stage of deactivation or de-orbiting during which the satellite is sent to a "graveyard" orbit.

The link is used:

firstly for remote command of the satellite from the earth (sending instructions that are to be executed on board the satellite), referred to below as "TC";

and secondly for telemetry, i.e. for the satellite transmitting information concerning its own state (technological verification, reporting on the execution of commands given remotely, attitude data, . . . ) with telemetry being referred to below as "TM".

It is also advantageous to use the same carriers as are used for command and telemetry in order to measure the distance between the ground station and the satellite.

Proposals have been made to use modulation with a subcarrier on the TTC link of a satellite; that solution is used on export satellites and on many space agency satellites. Proposals have also been made under such circumstances to use the residue of the telemetry signal carrier used for telecommunications purposes as a beacon signal; such a signal then provides pointing assistance to ground stations. For example, it is possible to use BPSK/FM or BPSK/PM modulation on the up channel and BPSK/PM modulation on the down channel; conventional notation is being used here where the modulation specified before the slash symbol is the modulation applied to the subcarrier, and the modulation after the slash symbol is that which is applied to the carrier. BPSK is an acronym for "binary phase shift keying" and is modulation by shifting phase between two states. FM and PM stand respectively for frequency modulation and for phase modulation.

When such subcarrier modulation is used, one known solution for measuring distance is as follows: the ground station transmits pure sinewave tones modulating the up carrier of the command link. These tones are demodulated on board and then used to remodulate the telemetry carrier on the down channel, simultaneously with the telemetry subcarrier. Range can be deducted by the phase shift measured on the highest frequency tone (known as the "major" tone), and ambiguity can be removed using so-called "minor" tones which are derived from the major tone by a geometric progression; thus, the European Space Agency (ESA) standard proposes a geometric progression of ratio 1/5.

Such subcarrier modulation suffers from the following drawbacks: firstly, the modulation is not robust drawbacks: firstly, the modulation is not robust in terms of resistance to interference; secondly such modulation is poorly adapted to co-localization, where co-localization consists in locating a plurality of satellites using the same frequency band. This is the normal situation for TC signals in BPSK/FM; these signals are used massively on export, and present a large bandwidth, about 800 kilohertz (kHz) for FM modulation having an excursion of ±400 kHz. Co-localization of a plurality of satellites requires this large bandwidth (plus the band required by the selectivity of TC receivers) to be multiplied by the number of satellites. Co-localization of plurality of satellites can thus require a frequency band that is greater than that proposed in satellite frequency band allocation. Thus, for a constellation of 11 satellites, co-localization using TC FM modulation with a subcarrier requires a frequency band of about 15 megahertz (MHz), making an allowance for the conventional selectively of TC receivers.

It is also known to use spread spectrum modulation for the TTC link of a satellite; this solution is implemented in particular for data relay satellites (DRS) users, for military applications, for the space shuttle or indeed for the destruction command link of the Ariane launcher.

Spread spectrum modulation is known per se, and is described, for example, in the following works: J. H. Homes, Coherent spread spectrum systems, and Kamilo Feher, Wireless digital communications (modulation and spread spectrum applications). Spread spectrum techniques make it possible to define a plurality of logical channels on a single physical channel corresponding to a carrier frequency and to a data passband. The best known of these techniques are the following:

direct sequence spread spectrum which includes code division multiple access (CDMA);

frequency hopping (FH) spread spectrum which also includes CDMA; and carrier sense multiple access (CSMA) spread spectrum In spread spectrum systems, the term "bit" is used for the binary information transmitted over a channel, while the term "chip" is used for the binary information associated with the pseudo-random sequence. These techniques make use of pseudo-random codes that are generally referred to as pseudo-noise (PN) codes. PN codes are selected using criteria associated with their autocorrelation or cross-correlation functions, so that a receiver decodes only the signal which is intended for that receiver, together with a possible interference signal which depends on the number of users and on the properties of the codes. In the spread spectrum standard implemented by space agencies for a TTC link, the up channel transmits simultaneously in unbalanced quadrature PSK (UQPSK) both the TC signal spread by a Gold code of length of 1023 on channel I, and the ranging signal which is a long PN code (1023*256) on the Q channel; these I and Q channels correspond to resolving a complex signal on two orthogonal axes. The ranging code is then retransmitted over the telemetry link. Range is deduced therefrom by measuring the time delay perceived on the ground for the ranging code as relayed by the satellite.

A TTC link with spread spectrum modulation is more robust in the face of interference than is a TTC link with subcarrier modulation; furthermore, the problem of co-localization or the size of the frequency band needed for such co-localization does not arise in such a crucial manner: it suffices to allocated different PN codes to the different satellites. Nevertheless, a spread spectrum TTC link presents the following drawbacks. Firstly, it is expensive to implement insofar as it requires a modification to standards that make use of the subcarrier modulation; in addition, for the down link, this solution presents the drawbacks:

of not enabling the residue of the telemetry carrier to be used as a telecommunications beacon, as is the case in present-day systems; and of not providing an effective solution for co-localization insofar as CDMA solutions are very sensitive to balancing the power transmitted by the various users, and this power balancing can be difficult to implement on the down link.

This problem of balancing power in co-localization is less sensitive on the up link where the ground station can continuously adjust the power level it transmits, whereas on the down link, the transmitted power is constant throughout the lifetime of the satellite and depends on the design of the satellite; this makes it difficult to ensure that an entire fleet of satellites behaves in uniform manner.

There thus exists a need for a TTC link for satellites which is robust in the face of interference, which makes co-localization possible, which can be implemented easily is existing systems, and which is also as compatible as possible with existing terrestrial systems.

Consequently, in an implementation, the present invention provides a method of transmitting signals over the telemetry, tracking, and command link of a satellite, the method comprising:

transmitting command signals and ranging signals using spread spectrum modulation on the command link from the earth to the satellite; and transmitting telemetry signals and ranging signals with subcarrier modulation over the telemetry link from the satellite to the earth.

Preferably, the command signals and the ranging signals are transmitted on the same carrier; likewise, the telemetry signals and the ranging signals may be transmitted on the same carrier(s).

In an implementation, the spread spectrum modulation transmission comprises:

transmitting command signals by spreading using a first code; and transmitting a ranging signal by spreading using a second code.

It is then advantageous for the length of the second code to be a multiple of the length of the first code.

In another implementation, the transmission with subcarrier modulation comprises modulating the carrier by one or more subcarriers and by a plurality of ranging tones.

It is also possible for the method to comprise:

the satellite receiving the ranging signal spread by the second code; and the satellite modulating the telemetry carrier which is modulated by the telemetry subcarrier and by a plurality of tones as a function of the received ranging signal.

Preferably, the spread spectrum modulation is UQPSK modulation spread by a Gold code. The subcarrier modulation may be PSK/PM modulation.

The invention also provides a satellite presenting:

a receiver circuit for receiving spread spectrum modulated command signals; and a transmitter circuit for transmitting subcarrier modulated telemetry signals.

Advantageously, the receiver circuit presents:

a receiver channel for receiving command signals spread by a first spreading code; and a receiver channel for receiving ranging signals spread by a second spreading code.

In which case, advantageously, the second code presents a length that is a multiple of the first code, and the receiver channel for receiving the ranging signals is controlled by the receiver channel for receiving the command signals.

In another embodiment, the transmitter circuit transmits a ranging signal. In which case, the satellite may present a link circuit connecting the receiver circuit to the transmitter circuit, and the ranging signal may be transmitted by the transmitter circuit as a function of signals received over the receiver channel for receiving ranging signals.

Other characteristics and advantages of the invention appear on reading the following description of implementations of the invention given purely by way of example and described with the reference to the accompanying drawing, in which the sole FIGURE is a block diagram of a portion of a satellite constituting an embodiment of the invention.

For the TTC link of a satellite, the invention proposes using spread spectrum modulation for the command up link, and it proposes using subcarrier modulation for the telemetry down link. The use of a spread spectrum command link makes it possible to solve problems of interference and limitations in terms of co-localization that arise with subcarrier modulation; the use of a subcarrier telemetry down link makes it possible to limit the amount of modification required compared with existing standards: compared with a TTC link having subcarrier modulation for TC and TM, the proposed solution minimizes the costs associated with changing the standard, insofar as only one of the two links is modified. The use of subcarrier modulation on the TM link makes it possible to continue using the residue of the telemetry carrier as a telecommunications beacon as in present-day systems. Finally, the use of subcarrier modulation on the TM link makes it possible to use already-existing terrestrial equipment, and in particular the telemetry link networks for use in putting the satellite on station.

For the ranging signals, the invention proposes making use on the up link and on the down link of the modulation and carriers respectively used for the command signals and for the telemetry signals.

The proposed solution goes against the teaching in the state of the art, in which TTC links use the same modulation for command and for telemetry; nor is there anything in the state of the art to suggest combining different kinds of modulation, particular since the solution for measuring distance on TTC links using spread spectrum modulation are different from those using subcarrier modulation.

Nevertheless, the proposed solution is viable and advantageous; from the point of view of interference, TC interference is much more than damaging than TM interference: with TC interference it is possible that the satellite will execute the wrong command and the consequences of that can be very severe. With TM interference, there is a momentary loss of the observability of the satellite. In addition, a TC link is much more subject to interference than is a TM link: the TC coverage of a satellite on station is in the best of circumstances its communications coverage, with it thus being possible to receive a large number of interference sources (whether international or inadvertent). In contrast, reception of the telemetry signal usually takes place with a high gain antenna on the ground, and thus with a beam of very narrow width, consequently providing immunity from any adjacent satellites with might interfere. As a result, using subcarrier modulation on the telemetry link is a viable solution in spite of the problem of interference; the solution proposed above serves to limit the consequences of interference on the command link, and thus to ensure that commands are properly transmitted to the satellite.

Concerning co-localization, the spectrum of the above-mentioned BPSK/FM export command signal is naturally ill-suited to effective frequency-division multiple access (FDMA) because of the width of its spectrum. A BPSK/PM telemetry signal has a narrow spectrum, about 150 kHz, and is much more suitable to effective FDMA, particularly since the filtering for separating TM signals from various co-localized satellites is performed on the ground where high performance filter techniques can be implemented at much lower cost than on board a satellite. The use of spread spectrum modulation on the command link makes it possible to avoid the problem of spectrum width when a plurality of satellites are involved; as explained above, this problem is smaller for the telemetry link since its spectrum is narrower.

Finally, it s when a satellite is on a drift orbit that the risk of the ground stations for that satellite interfering with some other satellite is at its greatest: the consequence is a loss of commandablity so log as the drifting satellite is close to a satellite that would receive interference. Implementing a spread spectrum command link can help solve this problem; where appropriate the solution may be associated with deploying the communications antenna on the satellite on a drift orbit so as to be able to reduce the command flux from the ground satellite associated therewith.

A satellite implementing this embodiment of the invention thus presents a circuit for receiving command signals that are spread spectrum modulated, and a circuit for transmitting telemetry signals that are subcarrier modulated.

A particular implementation of the invention is described below. In this example, UQPSK modulation is used for the spread spectrum modulation; the modulated bits of the command signal (channel I) are spread by a Gold code having a length of 1023. The chip rate is 500 kilocycles per second (kcycles/s). A ranging signal is also transmitted on the command link (on channel Q) and corresponds to a ranging PN code having a length of N*1023, i.e. a multiple of 1023. The chip rate is identical to that used for transmitting command signals. By selecting for the ranging signal a code that presents a length that is a multiple of the length of the code used for spreading the command signals, it is possible to simplify synchronization and tracking on the ranging code: once the first code is synchronized, there remain N positions to be tested for the long code and not N*1023; naturally, this assumes that the relative positions of two codes are known, and for example that the second code begins at the same time as the first code.

The length of the spreading code for the ranging signals is selected as a function of the need to resolve ambiguity; distance is measured by measuring the shift due to the propagation of the codes; this measurement is performed modulo the length of the code. A plurality of possible positions are thus obtained for the satellite, and only one of them corresponds to the real position of the satellite: the longer the code, the greater the distance between two potential positions for the satellite. The length of the code depends on the maximum distance over which it is necessary to resolve ambiguity, i.e. the distance which can be accepted between potential position for the satellite as provided by measurement. In practice, and for geostationary satellites, a maximum ambiguity-resolving distance of 5000 kilometers (km) can suffice; the length of the code is then selected so that the position of the satellite obtained by ranging is obtained modulo a distance that is greater than or equal to 5000 km. In the example of a code having a length which is a multiple of 1023, with a chip rate of 500 kcycles/s, a code of length 17*1023 suffices.

PSK/PM modulation is used for modulating the subcarrier. For ranging, it is possible, as in the state of the art, to make use of modulation of the telemetry carrier simultaneously with modulation of the telemetry subcarrier, using tones that are selected in compliance with the standard proposed by the ESA:
major tone at 100 kHz;
virtual minor tones in geometric progression with a ratio of 1/5 relative to the major tone (20,000 Hz, 4000 Hz, 800 Hz, 160 Hz, 32 Hz, 8 Hz); and
transmitted minor tones obtained by mixing with other minor tones (20,000 Hz, 16,000 Hz, 16,800 Hz, 16,160 Hz, 16,032 Hz, 16,008 Hz).

This selection makes it possible to measure distance by measuring the phase shift of the major tone, with ambiguity being resolved by means of the minor tones; the example of a geometric progression with a ratio of 1/5 leads to a maximum amount of ambiguity that can be resolved that is of the order of 18,000 km. The virtual minor tones are not easy to transmit, particularly those at the lowest frequency. Mixing them with other tones makes it possible to raise the frequency of the minor tones so that they can be transmitted over the down link.

The FIGURE is a block diagram of a portion of a satellite; the fixture shows only that portion of the satellite which serves to receive the ranging PN code transmitted over the command link and for transmitting the ranging signal over the telemetry link by modulating the carrier and the subcarrier.

The FIGURE shows firstly a fragmentary view of the command link receiver 2. This receiver has a radiofrequency processing system 4 at its input serving to amplify and change the frequency of the signals transmitted from the earth and received on an antenna (not shown); the amplified or frequency-converted signals are applied to a circuit 6 for synchronizing and tracking the spreading code used for the command signals (the "first" code), in parallel, the amplified signals are applied to a circuit 8 for synchronizing and tracking the spreading code used for the ranging signals (or "second" code); as explained above, insofar as the length of the second code is a multiple of the length of the first code, and insofar as the length of the chip is the same, synchronization of the first code can serve to simplify synchronization on the second code. The arrow connecting the synchronizing circuit 6 to the synchronizing circuit 8 symbolizes this use of synchronization on the first code to simplify synchronization on the second code. The receiver circuit 2 thus presents two channels, a first channel for command signals spread by the first code, and a second channel for ranging signals spread by the second code.

The signals delivered by the synchronizing circuit 6 are used in conventional manner for demodulating command signals. A chip counter 10 has a count input receiving chip clock signals delivered by the synchronizing and tracking circuit 8; a reset input of the chip counter 10 also received a signal coming from the synchronizing and tracking circuit 8. This reset signal is applied to the chip counter by the synchronizing and tracking circuit at the beginning of the second code. The counter counts up to a number equal to the length of the second code before being reset to zero at the beginning of the following code.

As a result, the chip counter 10 counts the chips of the second code as received from the earth over the up link. The output from the chip counter 10 is applied to the addressing input of two programmable read-only memories (PROMs) 12 and 14. Each of these two memories acts as a data table for the ranging tones; more precisely, the PROM 12 contains data corresponding to the different phases of the major tone, while the PROM 14 contains data corresponding to the different phases of the virtual minor tones. Digital signals are thus obtained from the read outputs of the PROMs 12 and 14 that are representative of the major tone and of the minor tones and that are in phase with the chips received over the ranging up link.

The signals coming from the PROMs 12 and 14 are applied respectively to digital-to-analog converters (DACs) 16 and 18. The first DAC thus outputs a major tone that is phase-shifted as a function of the received second code; the second DAC thus outputs the virtual minor tones occupying the range 8 Hz to 20 kHz in this example. The tones supplied by the two DACs 16 and 18 are applied to a set of mixers 20. The mixers mix the virtual minor tones with a minor tone at 16 kHz, for example, so as to output the major tone together with the real minor tones as specified above.

The output from the mixer 20 is applied to PSK/PM transmitter so as to sent the ranging signals simultaneously with the telemetry signals.

On arrival, ranging is performed with the major tone; this provides measurement accuracy of about 10 meters (m) under nominal link budget conditions with standard performance for the on-board and ground equipment and for phase being analyzed with precision of 0.2°; unfortunately, ambiguity is about 1.5 km; the minor tones which are sent sequentially or simultaneously with the major tone serves to resolve this ambiguity.

Various possibilities can be envisaged for resolving ambiguity by using the minor tones; each minor tone may be sent sequentially at an agreed rate, for example the minor tone may be changed at the beginning of each new second code. It is also possible to synchronize minor tone changeover from the ground: for example it is possible to cease sending the second code on the up link and to program the device to change minor tone each time there is an interruption in the transmission of the second code. It is also possible to use a system of two second codes, a first of these second codes triggering changes of minor tone, while a second of these second codes causes the current minor tone to be retained. One way or another, the various minor tones are used sequentially for the purpose of resolving ambiguity concerning the position of the satellite.

The circuit shown in the FIGURE is merely one example of a circuit that enables the tones used on the down link for modulating the telemetry carrier to be generated as a function of how the second code is received on the up link. The satellite thus presents a circuit 2 for receiving spread spectrum modulated command signals, a circuit 22 for transmitting ranging signals modulating the receiver 2 and the transmitter 22 and serving to modulate the telemetry carrier as a function of the received ranging signal. In the example shown in the FIGURE, the link circuit 24 comprises a counter 10, data tables 12 and 14, DACs 16 and 18, and the mixer 20.

Naturally, the present invention is not limited to the examples and implementation described and shown, and it can be varied in numerous ways by the person skilled in the art. Thus, it can be implemented on a single satellite, in which case the problem of co-localization clearly does not arise. The proposed solution applies not only to the technique of spreading using a direct sequence as given by way of example, but also to other techniques for spreading spectrum.

Examples are given above of kinds of modulation that correspond substantially to the various standards presently in existence; choosing these kinds of modulation makes it possible to limit the amount of modification that needs to be made to terrestrial and satellite equipment; it is also possible to use spread spectrum and subcarrier modulation of kinds that are different from those proposed above. In particular, it is not essential to use a code for spreading the ranging signals on the command channel that presents a length that is a multiple of the length of the code for spreading the command signals; this merely makes synchronization more complicated for the ranging signals.

The configuration shown in the FIGURE can also be simplified; depending on the chosen number n, a major tone can be delivered merely by dividing the 500 kHz chop clock and filtering. This major tone could have a value other than 100 kHz. The same solution can also be applied to the minor tones, using different division ratios, and as a function of the length ratio N between the second code and the first code; it would also be possible to use phase-locked loops for obtaining the codes used on the down link.

Various solution are possible for avoiding the problem of low frequencies that arises with the minor tones, other than mixing minor tones. It is thus possible to use a subcarrier, e.g. at around 10 kHz to 20 kHz that is frequency-modulated by the low frequency minor tones. Like the solution proposed above, this solution makes it possible to transmit the minor tones independently of their frequency.

Another variant of the circuit shown in the FIGURE consist in replacing the counter by an accumulator whose function is to sum an increment value on each clock pulse. The integration clock is the chip clock of the up the ranging tone merely by changing the increment of the accumulator.

The invention claimed is:

1. A method of transmitting signals over the telemetry, tracking, and command link of a satellite by using two different modulations for command signals and telemetry signals, the method comprising:
   transmitting the command signals and ranging signals using spread spectrum modulation on the command link from the earth to the satellite; and
   transmitting the telemetry signals and ranging signals with subcarrier modulation over the telemetry link from the satellite to the earth,
   wherein the telemetry signals are transmitted without using the spread spectrum modulation,
   wherein the subcarrier modulation is PSK/PM modulation.

2. The method of claim 1, wherein the command signals and the ranging signals are transmitted on the same carrier.

3. The method of claim 1, wherein the telemetry signals and the ranging signals are transmitted on the same carrier(s).

4. The method of claim 1, wherein the spread spectrum modulation transmission comprises:
   transmitting command signals by spreading using a first code; and
   transmitting a ranging signal by spreading using a second code.

5. The method of claim 4, wherein the length of the second code is a multiple of the length of the first code.

6. The method of claim 4, wherein the transmission with subcarrier modulation comprises modulating the carrier by one or more subcarriers and by a plurality of ranging tones.

7. The method of claim 6, wherein it comprises:
   the satellite receiving the ranging signal spread by the second code; and
   the satellite modulating the telemetry carrier which is modulated by the telemetry subcarrier and by a plurality of tones as a function of the received ranging signal.

8. The method of claim 1, wherein the spread spectrum modulation is UQPSK modulation spread by a Gold code.

9. The satellite of claim 1, wherein the receiver circuit presents:
   a receiver channel for receiving command signals spread by a first spreading code; and
   a receiver channel for receiving ranging signals spread by a second spreading code.

10. The satellite of claim 9, wherein the second code presents a length that is a multiple of the first code, and in that the receiver channel for receiving the ranging signals is controlled by the receiver channel for receiving the command signals.

11. The satellite of claim 10, wherein it presents a link circuit connecting the receiver circuit to the transmitter circuit, and in that the ranging signal is transmitted by the transmitter circuit as a function of signals received over the receiver channel for receiving ranging signals.

12. A satellite presenting:
a receiver circuit for receiving spread spectrum modulated command signals; and
a transmitter circuit for transmitting subcarrier modulated telemetry signals,
wherein the subcarrier telemetry modulated signals are PSK/PM modulated.

13. The satellite of claim 12, wherein the transmitter circuit transmits a ranging signal.

\* \* \* \* \*